United States Patent
Ahrensbach et al.

(10) Patent No.: US 9,562,516 B2
(45) Date of Patent: Feb. 7, 2017

(54) WIND TURBINE CONTROL SYSTEM

(71) Applicant: SIEMENS AKTIENGESELLSCHAFT, München (DE)

(72) Inventors: Janus Ahrensbach, Esbjerg (DK); Ulrich Vestergaard B. Hansen, Herning (DK); Flemming Bay Thunbo, Galten (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 257 days.

(21) Appl. No.: 13/753,829

(22) Filed: Jan. 30, 2013

(65) Prior Publication Data

US 2013/0211611 A1  Aug. 15, 2013

(30) Foreign Application Priority Data

Feb. 10, 2012 (EP) .................................... 12154857

(51) Int. Cl.
| | | |
|---|---|---|
| *G05B 11/01* | (2006.01) | |
| *F03D 7/04* | (2006.01) | |
| *G05B 15/02* | (2006.01) | |

(52) U.S. Cl.
CPC .............. *F03D 7/047* (2013.01); *F03D 7/048* (2013.01); *G05B 15/02* (2013.01); *Y02E 10/723* (2013.01)

(58) Field of Classification Search
None
See application file for complete search history.

(56) References Cited

U.S. PATENT DOCUMENTS

| | | | | |
|---|---|---|---|---|
| 2007/0258462 | A1* | 11/2007 | Veits | ................... H04L 12/4645 370/395.31 |
| 2009/0299493 | A1* | 12/2009 | Joergensen | ............. H04L 67/12 700/21 |
| 2010/0057265 | A1 | 3/2010 | Szemkus | |
| 2010/0098098 | A1* | 4/2010 | Daines et al. | ................ 370/401 |
| 2011/0080829 | A1* | 4/2011 | Breslin | ................... H04L 12/26 370/235 |
| 2012/0176893 | A1* | 7/2012 | Ghanwani | ........... H04L 12/4641 370/230 |

FOREIGN PATENT DOCUMENTS

| | | |
|---|---|---|
| EP | 1783365 A2 | 5/2007 |
| EP | 2080903 A1 | 7/2009 |
| WO | WO 0177525 A1 | 10/2001 |
| WO | WO 2010125140 A1 | 11/2010 |
| WO | WO 2010131069 A1 | 11/2010 |

* cited by examiner

*Primary Examiner* — Sean Shechtman (57) ABSTRACT

A control system for a wind turbine is provided. The control system includes a local terminal for locally generating wind turbine control commands, a control arrangement for generating control signals for the wind turbine on the basis of wind turbine control commands, and a switching arrangement for switching between a remote mode of operation over a main communication network, and a local mode of operation over a local communication network between the local terminal and the control arrangement such that a message passed between the local terminal and the control arrangement does not travel beyond the local communication network in the wind turbine. A method of locally controlling a wind turbine, and a wind park including a number of wind turbines, wherein each wind turbine comprises such a control system are also provided.

11 Claims, 4 Drawing Sheets

WIND TURBINE CONTROL SYSTEM

CROSS REFERENCE TO RELATED APPLICATIONS

This application claims priority of European Patent Office application No. 12154857.2 EP filed Feb. 10, 2012. All of the applications are incorporated by reference herein in their entirety.

FIELD OF INVENTION

A control system for a wind turbine, a method of locally controlling a wind turbine, and a wind park are provided.

BACKGROUND OF INVENTION

For generating electricity from wind energy, many wind turbines can be arranged in a wind park and can feed their output into a utility grid. The wind turbines of a wind park can be controlled collectively or individually by a park pilot or other control means that issues appropriate commands or performance setpoints. Inside a wind turbine, a turbine controller receives these commands and uses them to control the relevant elements of the wind turbine. At intervals, a wind turbine may require local servicing, for example to perform a diagnostic sequence or a maintenance routine. To this end, it is necessary for an operator or service technician to "disconnect" the turbine controller from the park pilot so that it can be controlled locally. To this end, in a known approach, a local operator panel can be connected to the turbine controller, for example over an RS422 connection. The turbine controller can be placed in a local mode of operation by throwing a mechanical or electric switch from a "remote" position to a "local" position. The switch might physically interrupt or break the connection to the outside world to ensure that the wind turbine cannot be remotely controlled by the park pilot, or the turbine controller can logically ignore any control commands or setpoints originating from outside when the switch is in the "local" position. The RS422 connection between the local operator panel and the turbine controller is physically and logically separate from a main communication network between the park pilot and the turbine controller. Because the RS422 technology does not offer communication over long distances, the distinction between the local and remote modes of operation is clear in such a realisation.

In more modern networked wind parks, it is desirable to connect all elements that communicate with one another using network technology. During a maintenance procedure in a wind turbine, it is necessary to ensure that the operator has full control over that wind turbine in which he is located. However, in a fully networked system, it can be problematic to identify where an operator is located. In a networked wind park, this is a complicated issue, since control commands are effectively sent over a network. One outcome of this might be that a local control command intended for one wind turbine might be erroneously sent to another wind turbine located in the vicinity. For example, a control command broadcast as a data packet from an operator panel in one wind turbine might also erroneously be received by a control arrangement of another wind turbine, if that other control arrangement happens to have the same address as the control arrangement for which the packet was intended or an incorrect address was entered when sending the control command. Such duplicate addresses can only be avoided if great care is taken in the configuration, and errors cannot be ruled out completely.

Also, control commands issued by a park pilot or originating from a customer server might be picked up and carried out by the turbine controller of a wind turbine that should in fact be locally controlled by an operator. Such conflicts could result in damage to wind turbine components and might even present a safety risk for the operator.

SUMMARY OF INVENTION

It is therefore an object to provide an improved way of controlling a wind turbine.

This object is achieved by the wind turbine control system, by the method of locally controlling a wind turbine, and by the wind park as specified in the claims.

The control system for a wind turbine comprises a local terminal for locally generating wind turbine control commands; a control arrangement for generating control signals for the wind turbine on the basis of wind turbine control commands; and a switching arrangement for switching between a remote mode of operation over a main communication network, and a local mode of operation over a local communication network between the local terminal and the control arrangement—whereby the main communication network and the local communication network preferably share hardware and/or software elements of the switching arrangement—such that a message passed between the local terminal and the control arrangement is visible only within that local communication network in that wind turbine, i.e. such a message does not leave or travel beyond that local communication network.

Here, the expression "communication network" or "network" is to be understood to mean a channel for sending and/or receiving data packets (also referred to as "frames", "messages" or just "signals") between two addresses, i.e. the sender of a data packet can be identified by an address, and the recipient of the data packet or frame can also be identified by an address. Effectively, communication over such a network is address-based, i.e. data packets are sent to specific addresses.

The local terminal could be a handheld terminal that can easily be carried by a service technician, for example a handheld device with a graphic user interface. Preferably, the local terminal is portable so that it can be carried from one wind turbine to another, for example when service or maintenance routines are to be carried out for multiple wind turbines in succession. The control arrangement can comprise a usual arrangement of control devices such as a turbine controller, an interface computer etc.

The "switching arrangement" in the context of the control system is to be understood to comprise all elements, modules or units that contribute to a switchover between local and remote modes of operation, or that permit a distinction to be made between a local or a remote origin or destination of a message or command.

An advantage of the wind turbine control system is that the switching arrangement effectively isolates or "hides" the local communication network of that wind turbine from the external environment, i.e. from any remote control systems such as a park pilot, a customer server, the internet, etc., even though the local communication network and the main communication network share elements of the switching arrangement. Even in a fully networked wind park, the wind turbine control system ensures that a remote user cannot take over control of a wind turbine in which a service technician is present when the switching arrangement indicates a "local" mode of operation. Furthermore, the wind turbine control system ensures that a handheld terminal will operate or control the right turbine, since the wind turbine control system according to the invention ensures that the handheld terminal will only talk to the correct control arrangement. The control system also prompts or "reminds" a service technician to place the local/remote switch in the "local" position after entering the turbine, because otherwise he will not be able to take control of the turbine.

The method of locally controlling a wind turbine comprising such a control system comprises the steps of manipulating the switching arrangement to indicate commencement of a local mode of operation and interruption of remote mode; carrying out a local control sequence by issuing wind turbine control commands for the control arrangement of that wind turbine using the local terminal; and manipulating the switching arrangement to indicate resumption of a remote mode of operation upon completion of the local control sequence, so that once again control commands of "remote" origin are received by the control arrangement.

The wind park comprises a number of wind turbines, wherein each wind turbine comprises a control system.

The advantage of such a wind park is that service personnel can be assured that, when a control sequence is being locally carried out in one wind turbine, any commands of the control sequence cannot be "picked up" by other wind turbines in the vicinity, so that no other wind turbine is adversely affected by that control sequence. Furthermore, the local control sequence of that wind turbine cannot be overridden by a command originating from a remote source such as the wind park pilot.

Particularly advantageous embodiments and features are given by the dependent claims, as revealed in the following description. Features of different claim categories may be combined as appropriate to give further embodiments not described herein.

As indicated above, it is important from a safety point of view to ensure that the operator can issue a local control sequence without any "interference"—intentional or unintentional—from a remote source. Equally, it is important that the local control sequence remains local and does not influence any other wind turbines. Therefore, in a particularly preferred embodiment, the switching arrangement comprises a physical switch such as a mechanical wall-mounted switch, with a first switch position associated with the remote mode of operation and a second switch position associated with the local mode of operation; and a virtual local area network (VLAN) switch, wherein the VLAN switch is realized to partition the physical network into at least two separate or distinct logical networks in which one logical network is a local network comprising specific components local only to that wind turbine, and another other logical network connects the control arrangement to the main communication network. In this way, only one logical network or partition is "enabled" according to the physical switch position, i.e. data will only be transferred over the "enabled" partition to and from a relevant component of the control arrangement, for example a command handler. In one example, if the switch is in "local" position, a message originating from the main communication network might actually be transported to the control arrangement, but an awareness of the physical switch position in the switching arrangement according will ensure that the control arrangement only "listens" to data received over the "local" partition. Equally, if the switch is in "remote" position, a message originating from a local terminal can be transported to the control arrangement, but as long as the physical switch is in the "remote" position, the switching arrangement ensures that the control arrangement only "listens" to data received over the "remote" partition. In the following, the terms "main communication network" and "remote network" may be used interchangeably.

By partitioning the physical network into separate logical networks, the VLAN switch can route a communication signal or command according to its origin and/or destination. Since the VLAN switch provides a means of differentiating between "local commands" and "remote commands", the control arrangement can ignore or accept commands depending on their origin and depending on the physical position of the local/remote switch. In this way, the switching arrangement comprises a virtual partition, hidden from the outside world, over which the local terminal and the control arrangement can communicate. For example, in a local mode of operation, a local handheld terminal and an interface computer of a control arrangement can be connected over their own partition. Of course, instead of partitioning the network into virtual LANs, a solution is possible in which at least parts of the internal or local network are separated from the external or remote network by physical separate LAN switches. Another alternative approach to partitioning into a "local" network and a "remote" network might be to use a network address translation (NAT) router and a static or dynamic mapping of IP addresses.

In the following, the physical or mechanical switch can be referred to simply as the "local/remote switch". The terms "local area network" and "local mode of operation" should not be confused. Both local and remote control of the wind turbine are effected over a LAN or a virtual LAN, and the term "local" in the sense of "local mode of operation" is used to indicated that this mode of operation is restricted exclusively to the environment inside the wind turbine, i.e. commands sent over the "local" network of a wind turbine will never leave the local or hidden partition and will therefore never leave that wind turbine.

The physical "local/remote switch" is generally hard-wired in some way to a turbine controller and/or an interface computer, for example over a suitable input/output (I/O) module, so that a communication port of the control system is connected to the right communication partner, i.e. either the park pilot or the hand-held terminal, depending on the physical switch position. In a preferred embodiment, therefore, the physical position of the "local/remote switch" is communicated to the turbine controller and/or an interface computer over such a connection.

In a further preferred embodiment, the control arrangement comprises a dedicated port for communication over a local communication network, and the local terminal also comprises a dedicated port for communication over the local communication network and, in local mode, communication over the local network is performed only between these dedicated ports. For example, the control arrangement and the local handheld terminal can each comprise a dedicated static IP address for local communication, and data is only accepted by the controller between these addresses or ports when the local/remote switch is in its "local" position. For normal control of the wind turbine, for example by means of the park pilot, different ports are used to pass commands between the control arrangement and the remote control arrangement.

Preferably, a dedicated local communication port of the control arrangement is configured in a local area network interface of the control arrangement. For a wind park comprising a plurality of wind turbines, an identical configuration sequence is preferably performed for each such local area network interface, so that the switching arrangements of each wind turbine will behave in the same manner.

The control arrangement, as indicated above, can comprise an additional interface computer. This setup may have certain advantages, for example an interface computer can provide hardware with increased data storage capability, and the ability to run third-party software on another operating system, so that the control system can comprise a very reliable part (the turbine controller) and a part that has lower reliability requirements (the interface computer). Therefore, in a further preferred embodiment, the control arrangement comprises a turbine controller and an interface computer, which interface computer comprises a dedicated local communication port or internet protocol (IP) address and wherein, in local mode of operation, communication over the local communication network is performed between the dedicated local communication port of the interface computer and the dedicated local communication port of the local terminal. In other words, a command handler of the interface computer will only receive commands from the local terminal over its local communication port when the turbine is in local mode of operation. Again, these dedicated local communication ports can comprise static IP addresses reserved only for this local data exchange. In another preferred embodiment, a multipoint protocol can be implemented to allow control commands to be sent to the turbine controller even if the interface computer is not accessible for whatever reason.

In a further preferred embodiment, the control arrangement comprises a turbine controller and an interface computer, and the turbine controller comprises a dedicated local communication port or internet protocol (IP) address and wherein, in local mode, communication over the local network is performed between the dedicated local communication port of the turbine controller and the dedicated local communication port of the local terminal. In other words, a command handler of the turbine controller will only receive commands, originating from the local terminal, over that local communication port when the turbine is in "local" mode of operation. In such an embodiment, any commands issued by the local handheld device can be received by the interface computer and passed on over the local hidden VLAN to the turbine controller, so that the wind turbine can be controlled according to the control sequence.

A dedicated local communication port of the control arrangement is preferably realised as a port or IP address of a local area network (LAN) interface of the control arrangement, for example as a dedicated local communication port of a LAN card. In the case that the control arrangement comprises a turbine controller and an interface computer, the turbine controller and interface computer preferably each comprise two LAN cards, whereby one LAN card has a dedicated local communication port for local, hidden communication over a local partition, and the other LAN card has a communication port for normal communication over the other partition in a remote mode of operation. In this way, the wind turbine controller, the interface computer, and the local terminal can be connected together over their own hidden partition when it is necessary, for example during a local maintenance routine, while control of the wind turbine can be performed over the other "non-hidden" partition during normal operation.

In a further preferred embodiment, the control arrangement is realised to be capable of performing VLAN-tagging. In this way, the control arrangement can be realised to adapt data packets or frames intended only for local exchange. The headers of any data packets intended for the handheld terminal are then altered so that these can only be passed over the local hidden network or partition, for example over a VLAN trunk connection between the control arrangement and the handheld terminal.

As indicated above, it may be desirable to be able to observe, from a remote location, the progress of a maintenance or diagnostic routine being carried out in a wind turbine. Therefore, in a further particularly preferred embodiment, the control system is realised to allow a read access of the main communication network, so that wind turbine data can be read or observed, even though the wind turbine cannot be controlled from the outside. To this end, the switching arrangement can connect the control system and the local terminal over a hidden partition, so that the wind turbine is only controllable via the local terminal, but wind turbine data and/or command data can be also sent out to the remote location for analysis.

A wind park can comprise many wind turbines, and the service of the wind turbines should preferably be as uncomplicated as possible. Therefore, in a particularly preferred embodiment, the control arrangement of each wind turbine comprises a dedicated local communication port for communication over a local communication network, and the dedicated local communication port is the same for each control arrangement. For example, for each turbine controller or interface computer, the dedicated local communication ports have the same IP address or port number. Preferably, also, each switching arrangement comprises a VLAN switch, and each VLAN switch comprises an identical switching configuration, i.e. the address spaces of the VLAN switches, i.e. at least the address spaces relevant to the local partition, are all the same. For example, the same sequence of configuration commands regarding network name, port number, etc., can be issued to configure each switching arrangement identically. When these measures are taken, a service technician or operator can simply enter any wind turbine, throw the physical switch to the "local" position, and commence the control sequence, because the simple act of throwing the switch to the local position results in the "activation" of the local partition, so that the wind turbine can be controlled from the hand-held terminal. As long as the physical switch is in this position, control commands for the wind turbine can only originate from the local terminal. In this way, service and maintenance of many wind turbines can be carried out in a particularly simple and quick manner, so that considerable savings may be made.

BRIEF DESCRIPTION OF THE DRAWINGS

Other objects and features will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF INVENTION

Figure 1:
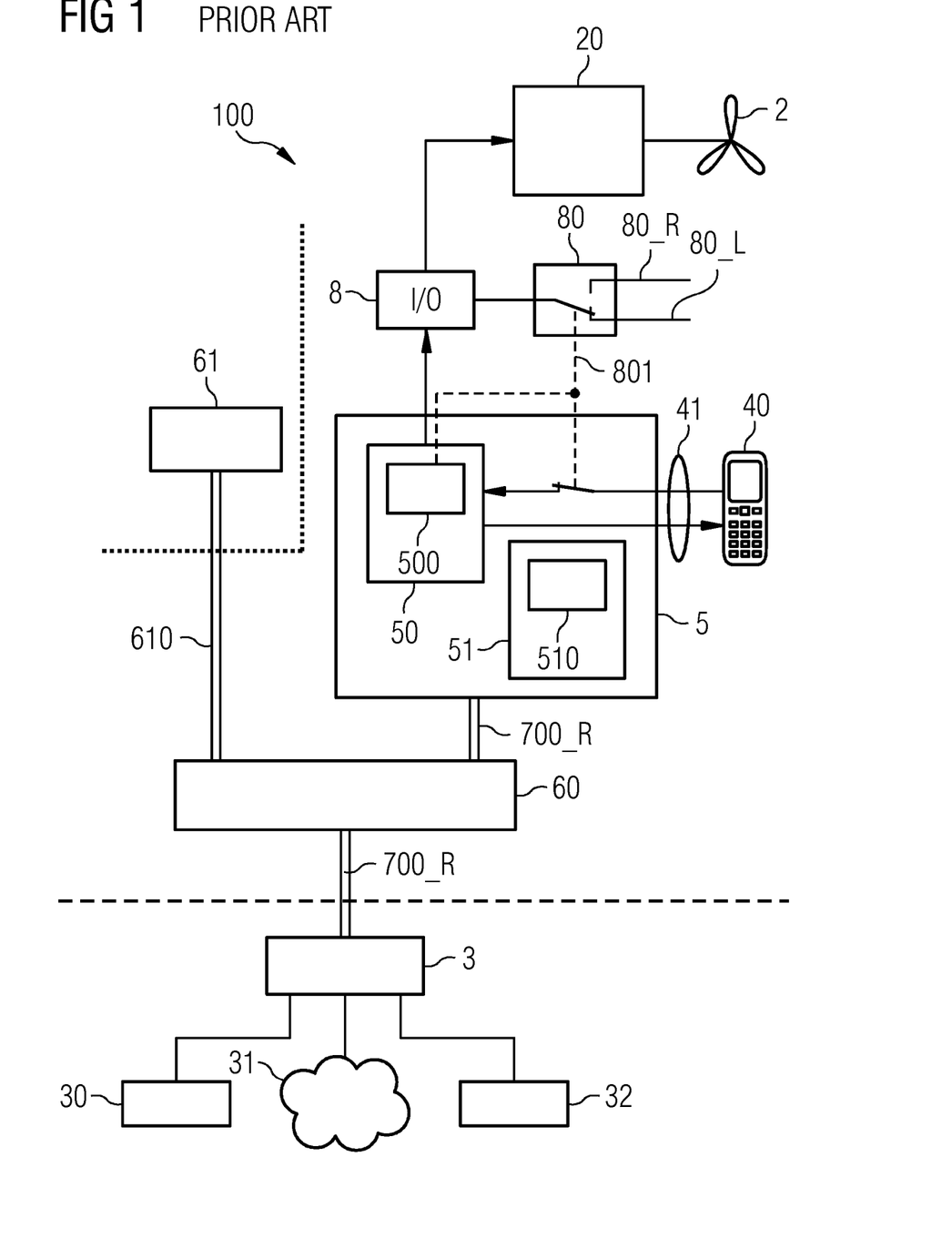
FIG. 1 shows a block diagram of a prior art control system for a wind turbine.

FIG. 1 shows a prior art control system 100 for a wind turbine. For the sake of clarity, only those relevant elements are shown here. Wind energy is converted to electricity by wind turbine blades 2 and a generator 20. The generator 20 and the blades 2 are controlled by a control arrangement 5 which in turn can be remotely controlled by a park pilot 30, a customer server 32, or over the internet, as indicated by the cloud symbol 31. These elements 5, 30, 31, 32, 33 are connected using switches 3, 60, 61, for example LAN switches or VLAN switches 3, 60, 61, in a suitable network configuration. The control arrangement 5 comprises a turbine controller 50 and an interface computer 51, which is a common realisation of such a control arrangement. These components 50, 51 are shown here separately but may of course be realised as a single component. Components above the dashed line are arranged inside a wind turbine, while everything below the dashed line can be considered to be "remote" from the wind turbine. Many wind turbines arranged in a wind park can be controlled by a single remote control arrangement 3, 30, 31, 32. For the purposes of illustration, only one wind turbine is indicated here. Inside the wind turbine, the control arrangement 5 forwards control commands originating from the remote control arrangement 3, 30, 31, 32 over an I/O device 8 to the wind turbine components 20, for example to a generator or other component such as a sensor, input/output device, cooling module etc. For the sake of clarity, these elements are collectively indicated in the diagram by a single block 20, and can be located in a nacelle on top of a tower, but could equally be distributed in the hub and in the tower base. In this example, it is assumed that the control arrangement 5 for controlling all those devices is located at the tower base, while some or all wind turbine components are arranged in the hub or nacelle, and this spatial separation is indicated by the dotted line. These elements 5, 20 can all be connected over a network managed by switches 60, 61 such as VLAN switches 60, 61.

A local/remote switch 80 is used to control whether the wind turbine 2 is to be controlled by the remote control arrangement 3, 30, 31, 32 or by a local control interface 40, for example an operator panel 40 connected to the control system 5 over an RS422 connection 41. Command handlers 500, 510 of the control system 5 and the RS422 connection 41 are "aware of" the switch position, as indicated by the dashed line 801 between the switch 80 and the control arrangement 5 and the RS422 connection 41. The switch position can be communicated to the control system using an I/O module 8 or in any other suitable manner, and is only indicated here by the dashed line for simplicity. In a remote mode of operation, the switch 80 would be in its "remote command" position 80_R, while the RS422 connection 41 would be "open", so that the wind turbine 2 would only be controlled remotely by the remote control arrangement 3, 30, 31, 32 over a "remote" command network 700_R, indicated by the thick white line. Control commands can also be sent via a trunk connection 610 and the switch 61 to components in the hub.

To control the wind turbine locally, an operator panel 40 is connected to the control arrangement 5 over the RS422 wired connection 41, and an operator or service technician can use this to issue local control commands. To carry out a local control sequence, the operator must first throw the switch 80 from a "remote command" position 80_R to a "local command" position 80_L, as shown here. This "local" position is made known to the RS422 connection, so that local control commands can be received by the control arrangement 5 and forwarded over an I/O device 8 to the wind turbine components 20. When in local mode, the control arrangement 5 will ignore any incoming "write" access from the remote control arrangement 3, 30, 31, 32, but it may allow "read" access, so that, for example, the progress of the local control sequence can be observed.

As explained above, an RS422 connection 41 between the handheld device and the control arrangement 5 is associated with a number of disadvantages.

Figure 2:
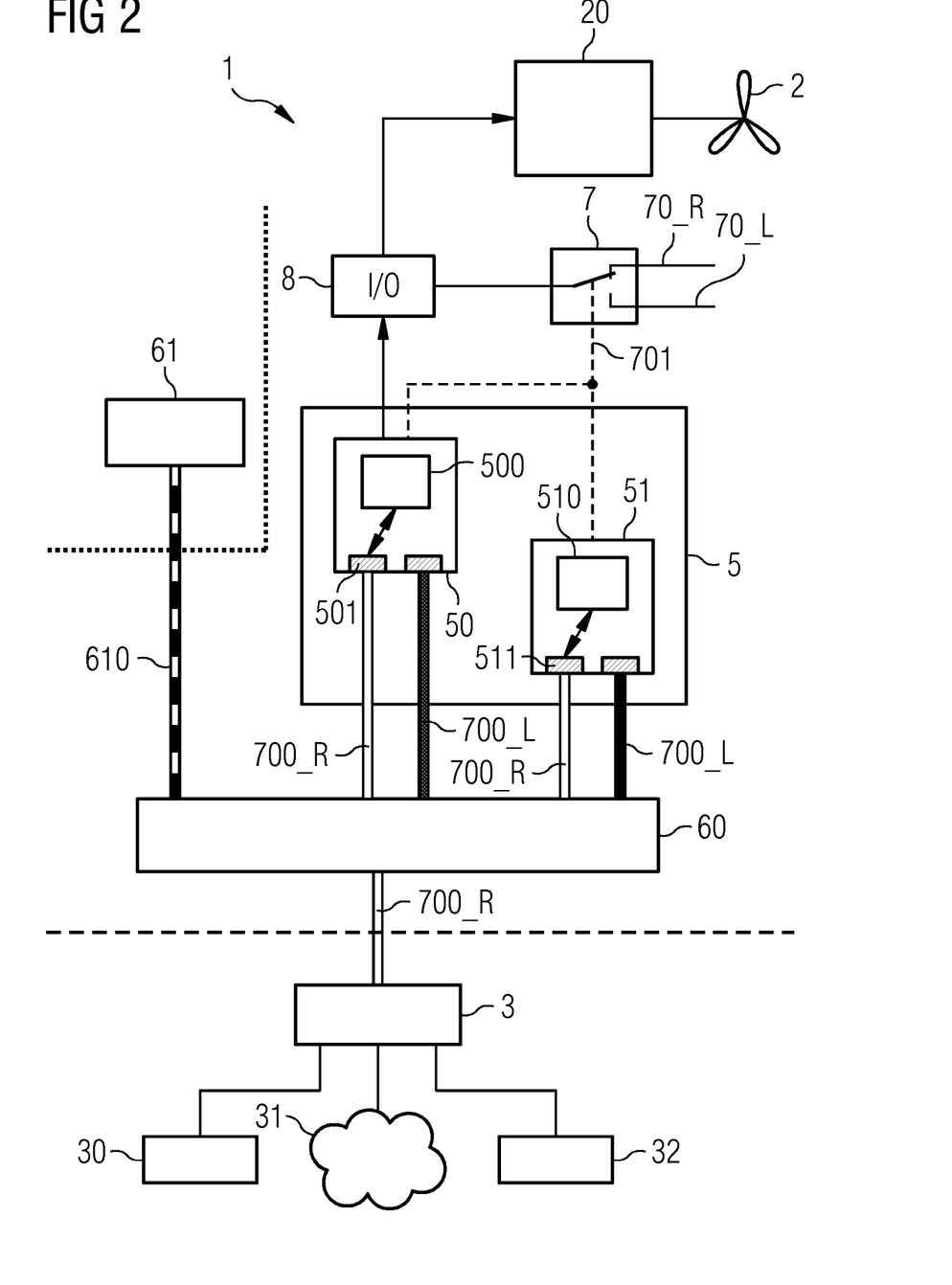
FIG. 2 shows a block diagram of a control system for a wind turbine according to a first embodiment, in a remote mode of operation.

FIG. 2 shows a block diagram of a control system 1 for a wind turbine according to a first embodiment. Here, the control arrangement 5 is arranged inside a wind turbine that can be remotely controlled as described above. Again, the control arrangement 5 comprises a turbine controller 50 and an interface computer 51. Here also, VLAN switches 60, 61 can connect the various elements 5, 50, 51, 20 for control of the wind turbine over a local area network (LAN). The control system 1 comprises a physical local/remote switch 7 connected to an element 50, 51 of the control system 5 by some suitable means 701 directly or indirectly, so that the turbine controller 50 and the interface computer 51 are "aware" of a switch position 70_R, 70_L. The turbine controller 50 and the interface computer 51 each comprise a command handler 500, 510 for managing the incoming and outgoing commands. The connection 701 effectively "throws a switch" for a command handler 500, 510 (a step which can be carried out in hardware or software, indicated here by the dashed lines) so that commands to and from the command handler 500, 510 are received and sent over the correct ports. In a remote mode of operation, with the switch in "remote" position 70_R, the connection 701 causes the command handlers 500, 510 to communicate over ports 501, 511 dedicated to remote communication (indicated by the double-ended arrows in the blocks 50, 51), so that the control arrangement 5 is effectively connected to the remote control arrangement 3, 30, 31, 32 over a network 700_R, indicated here by the thick white line. In "remote" mode, for example, the command handlers 500, 510 can receive commands issued by the park pilot 30, over the "remote" partition 700_R. In this mode, a further local partition 700_L is effectively ignored by the command handlers of the control arrangement 5, even though the local partition 700_L and the remote partition 700_R share elements 60, 61 of the switching arrangement. The VLAN switch 61 also connects any components in the nacelle or hub to the remote network 700_R over a VLAN trunk 610, shown here by the thick black-and-white line to indicate that it serves to pass traffic intended for different partitions, as will be explained below.

Figure 3:
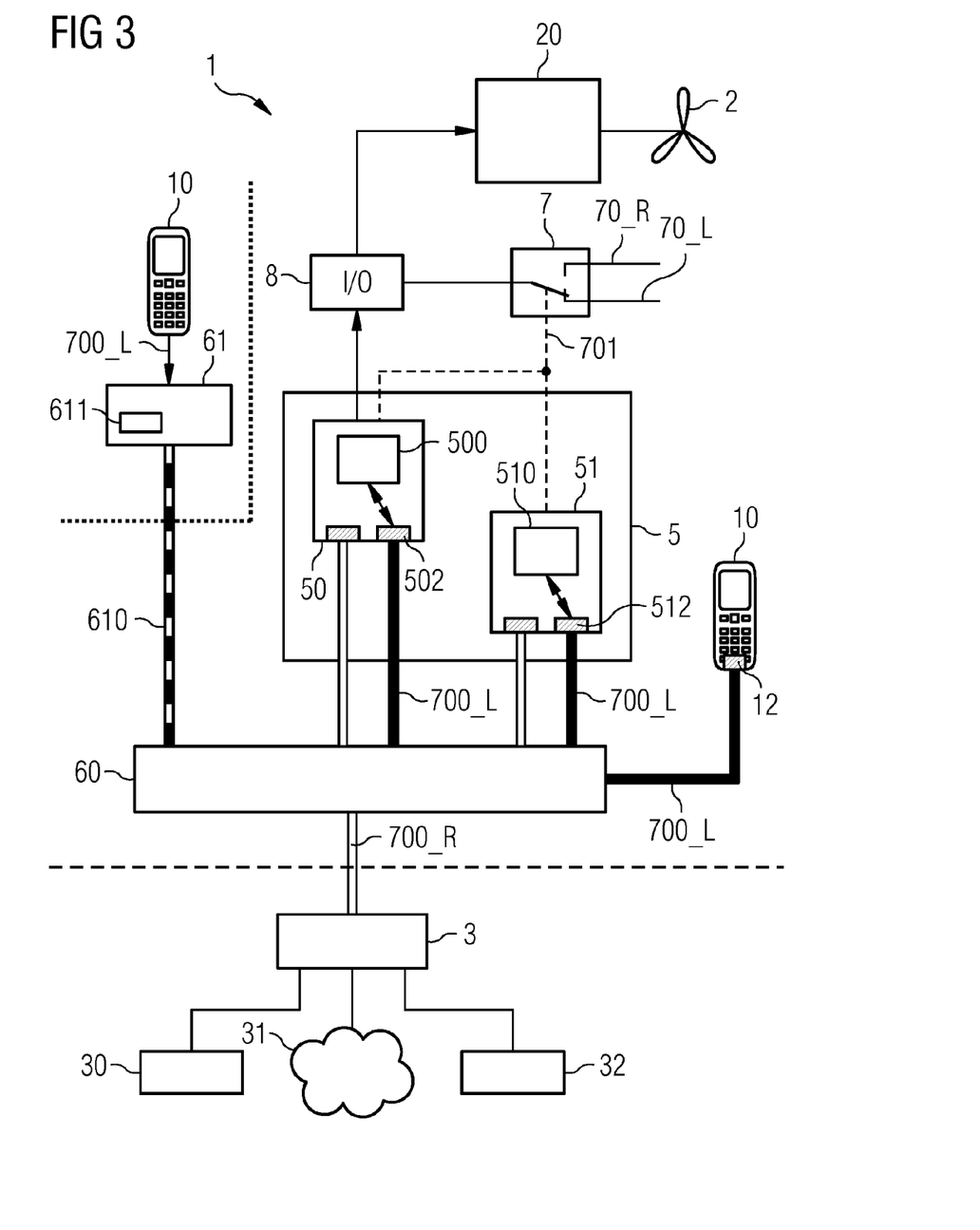
FIG. 3 shows a block diagram of the control system of FIG. 2 in a local mode of operation.

FIG. 3 shows a block diagram of the control system 1 in a local mode of operation. Here, a service technician has thrown the local/remote switch 7 so that it is in the "local" position 70_L. The connection 701 causes the command handlers 500, 510 to communicate over ports 502, 512 dedicated to local communication. Any data exchanged between the handheld device 10 and the control arrangement 5 will be routed by the VLAN switches over a local network 700_L, indicated by the thick black line, between a port 12 in the handheld device 10, a port 502 in the turbine controller 50, and a port 512 in the interface computer 51 (indicated by the double-ended arrows in the blocks 50, 51). At the same time, this "local" network 700_L is isolated or hidden from the remote control arrangement 3, 30, 31, 32, such that any write access originating from the remote command network 3, 30, 31, 32 is not "seen" by the control arrangement 5, 50, 51. This ensures that the wind turbine can only be controlled over the handheld terminal 10 and the local "hidden" VLAN 700_L. At the same time, since the handheld terminal 10 and the control arrangement 5, 50, 51 are connected over the local VLAN 700_L, any commands issued by the handheld terminal 10 will only be received by the control arrangement 5, 50, 51 and will not be broadcast to any other wind turbines in the vicinity. In this way, the service technician can be sure that only this wind turbine will be affected by any commands of the control sequence he carries out. Even if the operator ascends into the hub or nacelle, as indicated by the alternative position of the local terminal 10 near the VLAN switch 61, any locally issued commands will be routed by the VLAN switch 61 over the VLAN trunk 610 so that these commands are also channelled over the local network 700_L. This diagram also indicates a VLAN tagging module 611 in the VLAN switch 61, which adds a VLAN tag to any message originating from a component located in the hub or nacelle before sending the message over the VLAN trunk 610. Such tags serve to inform any recipient (e.g. the VLAN switch 60) for which partition 700_L, 700_R the message is intended. As mentioned above, this scenario still permits a remote system such as the park pilot 30 to "read" data from the control arrangement during a local mode of operation, while any write accesses originating from the switch 3 are effectively ignored by the control arrangement, i.e. they are not "seen" by the command handler, when in local mode.

Figure 4:
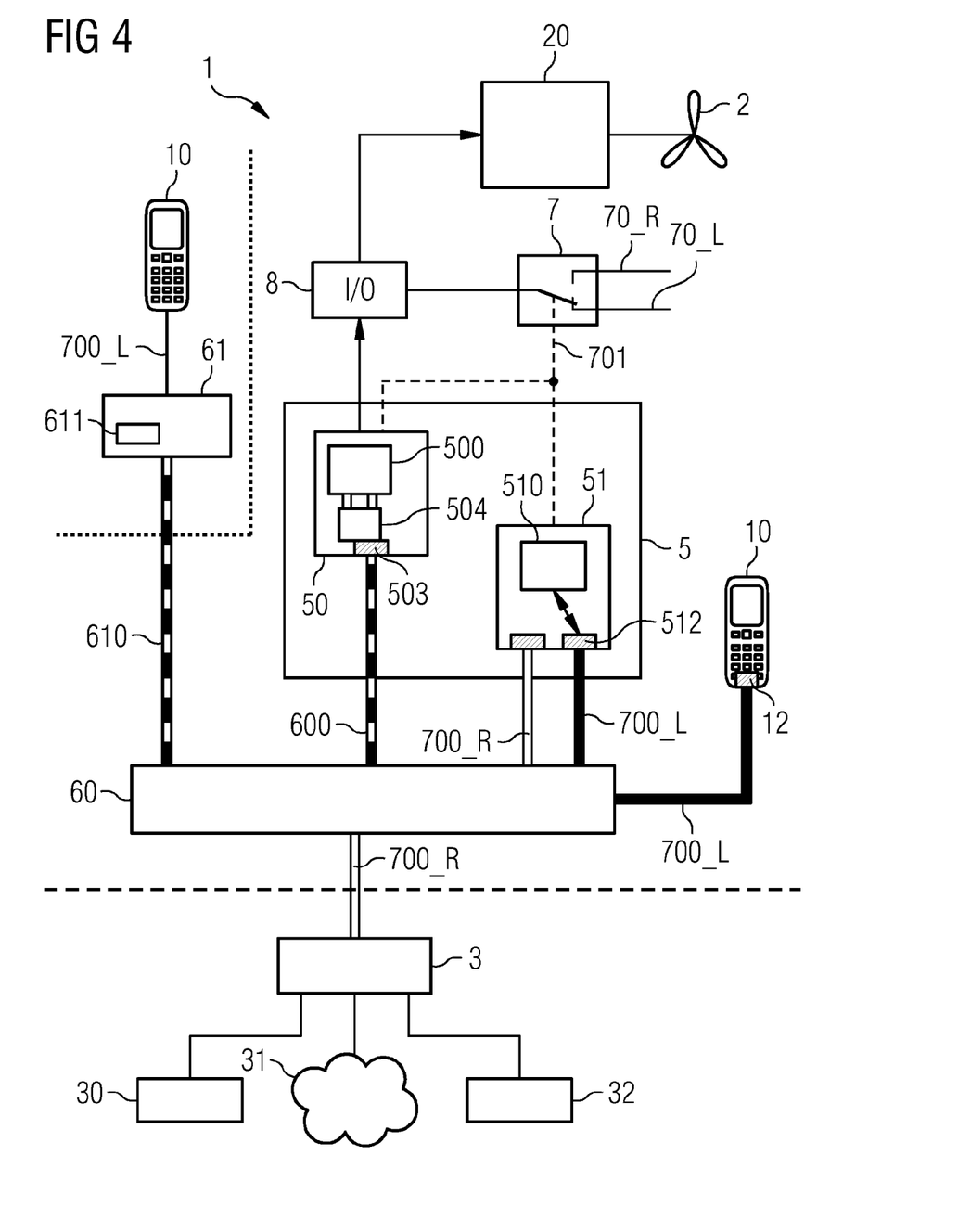
FIG. 4 shows a block diagram of a control system for a wind turbine according to a second embodiment.

FIG. 4 shows a block diagram of the control system 1 according to a second embodiment, and is based on the first embodiment shown in FIGS. 2 and 3 above. Here, the turbine controller 50 does not comprise separate ports for each partition, but instead only comprises a single port 503. In addition, the turbine controller 50 comprises a VLAN splitter 504, which is realised to analyse any command arriving at or leaving the turbine controller 50. A command arriving over a trunk connection 600 will comprise a tag indicating its origin, whether it belongs to the "remote" partition or the "local" partition. The command handler 500 of the turbine controller will then either accept the message or ignore it, depending on the position of the switch 7. A command generated by the turbine controller 50 will be equipped with a tag indicating a local or remote destination, again depending on the position of the switch 7. Alternatively or in addition, the interface computer could also comprise such a splitter 504.

Although preferred embodiments have been disclosed and variations thereon, it will be understood that numerous additional modifications and variations could be made thereto without departing from the scope of the invention. For example, instead of using VLAN technology to partition the communication channels for local or remote control of the wind turbine, the same problem could be solved using a network address translation (NAT) router. Such a solution can require configuration involving a static or dynamic mapping of IP addresses.

For the sake of clarity, it is to be understood that the use of the singular "a" or "an" throughout this application does not preclude a plurality, and "comprising" does not exclude other steps or elements. Use of the term "unit" or "module" does not preclude the use of several units or modules.

We claim:

1. A control system for a wind turbine, the control system comprising:

a local terminal for locally generating wind turbine control commands;
a control arrangement for generating control signals for the wind turbine on the basis of the wind turbine control commands; and
a switching arrangement for switching between a remote mode of operation over a main communication network, and a local mode of operation over a local communication network between the local terminal and the control arrangement such that a message passed between the local terminal and the control arrangement does not travel beyond that local communication network in the wind turbine;
wherein the switching arrangement comprises a physical switch having a first switch position associated with the remote mode of operation and a second switch position associated with the local mode of operation;
a virtual local area network switch, wherein the virtual local area network switch is realized to establish at least a main communication network partition and a local communication network partition, wherein the virtual area network switch is configured to ignore or accept commands based on command origin, the first switch position and the second switch position;
wherein the control arrangement comprises a Virtual Local Area Network-tagging module for adding a Virtual Local Area Network tag indicating command origin to a data packet passed between the control arrangement and the local terminal; and
wherein the addition of the Virtual Local Area Network tag enables control signals to only be passed over a Virtual Local Area Network trunk between the control arrangement and the local terminal.

2. The control system according to claim 1, wherein the local terminal is logically connectable to the local communication network partition.

3. The control system according to claim 1,
wherein the control arrangement comprises a first and second dedicated local communication port for communication over the local communication network, and
wherein the local terminal comprises a third dedicated local communication port, and, in local mode, communication over the local network is performed only between the first or second dedicated local communication port of the control arrangement and the third dedicated local communication port of the local terminal.

4. The control system according to claim 3,
wherein the control arrangement further comprises a turbine controller and an interface computer, which interface computer comprises the first dedicated local communication port and
wherein, in local mode of operation, communication over the local communication network is performed between the first dedicated local communication port of the interface computer and the third dedicated local communication port of the local terminal.

5. The control system according to claim 4,
wherein the turbine controller comprises the second dedicated local communication port, and
wherein, in local mode, communication over the local network is performed between the second dedicated local communication port of the turbine controller and the third dedicated local communication port of the local terminal.

6. The control system according to claim 3, wherein the first or second dedicated local communication port of the control arrangement is configured in a local area network interface of the control arrangement.

7. A control system according to claim 3, wherein the control system is configured to allow communication only between the first or second dedicated local communication port of the control arrangement and the third dedicated local communication port of the local terminal during local mode of communication.

8. A method of locally controlling the wind turbine comprising a control system according to claim 1, the method comprising:
- manipulating the switch of the switching arrangement to indicate commencement of a local mode of operation;
- carrying out a local control sequence by issuing the wind turbine control commands for a control arrangement of the wind turbine using the local terminal;
- passing the control commands between the local terminal and the control arrangement such that the control commands do not travel beyond a local communication network in the wind turbine; and
- manipulating the switch of the switching arrangement to indicate resumption of a remote mode of operation upon completion of the local control sequence.

9. A wind park, comprising:
- a plurality of wind turbines,
- wherein each wind turbine comprises a control system according to claim 1.

10. The wind park according to claim 9, wherein each control arrangement comprises a dedicated local communication port for communication over a local communication network, and the dedicated local communication port is the same for each control arrangement.

11. The wind park according to claim 10,
- wherein each switching arrangement comprises a plurality of Virtual Local Area Network switches, and
- wherein each equivalent Virtual Local Area Network switch comprises an identical switching configuration.

* * * * *